(12) United States Patent
Yonekubo et al.

(10) Patent No.: US 7,532,396 B2
(45) Date of Patent: May 12, 2009

(54) SCREEN AND PROJECTION SYSTEM

(75) Inventors: Masatoshi Yonekubo, Hara-Mura (JP);
Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/869,434

(22) Filed: Oct. 9, 2007

(65) Prior Publication Data
US 2008/0088921 A1 Apr. 17, 2008

(51) Int. Cl.
*G03B 21/60* (2006.01)
(52) U.S. Cl. ...................................... 359/459
(58) Field of Classification Search ................. 359/459, 359/455, 454, 456, 449
See application file for complete search history.

(56) References Cited

U.S. PATENT DOCUMENTS

| | | | |
|---|---|---|---|
| 5,361,163 A | | 11/1994 | Matsuda et al. |
| 5,696,625 A | * | 12/1997 | Malifaud et al. ............ 359/459 |
| 7,248,406 B2 | * | 7/2007 | May et al. .................... 359/452 |

FOREIGN PATENT DOCUMENTS

| | | |
|---|---|---|
| JP | A-58-052628 | 3/1983 |
| JP | A-2006-215162 | 8/2006 |
| KR | 1997-0002673 B1 | 3/1997 |

* cited by examiner

*Primary Examiner*—Christopher Mahoney
(74) *Attorney, Agent, or Firm*—Oliff & Berridge, PLC

(57) ABSTRACT

A screen includes a plurality of convexes disposed on a flat surface with a clearance left between one another. The convexes reflect diagonal incident light coming in a predetermined direction other than the normal line direction of the flat surface, and block the diagonal incident light by reflecting the incident light such that the incident light cannot reach each area between the adjoining convexes on the flat surface.

20 Claims, 13 Drawing Sheets

SCREEN AND PROJECTION SYSTEM

BACKGROUND

1. Technical Field

The present invention relates to a screen and a projection system, and more particularly to a technology of a screen used in combination with a projector which projects light from a position close to the screen.

2. Related Art

A reflection type screen used in combination with a so-called front projection type projector needs to have high reflectivity to produce a bright image. This type of screen is further required to have high diffusibility sufficient for diffusing light to a desired area to obtain preferable visibility angle characteristics. A technology for obtaining high reflectivity and high diffusibility of the screen has been proposed in JP-A-58-52628, for example.

Recently, a projector capable of achieving close projection has been proposed. By the function of close projection, the projector can display an image on a large screen from a short projection distance. During the close projection, the projector applies light having a large incident angle to a screen. A screen in related art has a flat surface or a surface having small concaves and convexes to which paints in white, silver, or other colors are applied, for example. When light having a large incident angle is applied to this type of screen, most of the light reflected by the screen travels in a direction having a large angle with respect to the normal line of the incident surface. In this case, an image observed from the front of the screen does not have sufficient brightness. Moreover, the related-art screen which reflects not only light coming from the projector but also outside light as unnecessary light with high reflectance cannot obtain sufficient contrast in many cases. Particularly, under the environment containing a considerable amount of outside light, the light quantity of the supplied projection light needs to increase. According to the related-art technology, therefore, it is difficult to produce an image having high brightness and high contrast when the image is displayed on a large screen from a short projection distance.

SUMMARY

It is an advantage of some aspects of the invention to provide a screen used to produce an image having high contrast and high brightness when the image is displayed on a large screen from a short projection distance, and to provide a projection system using this screen.

A screen according to a first aspect of the invention includes a plurality of convexes disposed on a flat surface with a clearance left between one another. The convexes reflect diagonal incident light coming in a predetermined direction other than the normal line direction of the flat surface, and block the diagonal incident light by reflecting the incident light such that the incident light cannot reach each area between the adjoining convexes on the flat surface.

When the direction of the diagonal incident light reaching the convexes is a predetermined direction, the diagonal incident light cannot reach the area between the adjoining convexes. Since the diagonal incident light has a large incident angle, a beam having passed through the vicinity of one convex can be directed toward another convex positioned next to the one convex. While tile related-art screen reflects light by the entire surface of the screen, the screen according to this aspect of the invention has angle selectivity which allows the diagonal incident light to be efficiently reflected. The convexes may have a structure which allows the diagonal incident light to travel in a desired direction. Thus, light in accordance with an image signal can efficiently advance toward the audience during close projection, producing a bright image for display. Moreover, since the diagonal incident light is efficiently reflected, reflection of outside light coming in a direction different from that of the light according to the image signal can be reduced. By the reduction of the outside light reflection, high contrast can be obtained. Accordingly, a screen used to produce an image having high contrast and high brightness when the image is displayed on a large screen from a short projection distance can be provided.

It is preferable that each of the convexes has a reflection portion which reflects the diagonal incident light. In this structure, the diagonal incident light reaching the convexes can be efficiently reflected.

It is preferable that a substrate which has the flat surface and transmits lights and an anti-reflection member provided on the side of the substrate opposite to the side having the convexes to reduce reflection of light are further included. The anti-reflection member reduces reflection of outside light having passed through the substrate. Thus, reflection of the outside light can be reduced.

It is preferable that an anti-reflection member provided between the adjoining convexes to reduce reflection of light is further included. The anti-reflection member reduces reflection of outside light reaching the areas between the adjoining convexes on the flat surface. In this structure, reflection of the outside light can be reduced.

It is preferable that the convexes diffuse the diagonal incident light. In this structure, preferable visibility angle characteristics can be obtained.

It is preferable that the convexes are so shaped as to have the longitudinal direction corresponding to a first direction, and are arranged in a second direction orthogonal to the first direction. In this structure, the diagonal incident light can be reflected in a desired direction. Moreover, an image having uniform brightness can be easily obtained, and manufacture can be simplified.

It is preferable that each of the convexes has a curved surface in the first direction and substantially flat having a curvature in the second direction. In this case, the diagonal incident light can be diffused.

It is preferable that the convexes are arranged in both the first direction and the second direction orthogonal to the first direction. In this structure, the diagonal incident light can be reflected in a desired direction. Moreover, the convexes can be disposed with random patterns. Since the arrangement patterns of the convexes are random, moire effect can be reduced.

It is preferable that each of the convexes has a curved surface having curvatures in both the first direction and the second direction. In this case, the diagonal incident light can be diffused.

It is preferable that the convexes are disposed substantially concentric with one another. In this structure, the reflectivity characteristics of the screen can be equalized, and an image having a uniform brightness can be obtained.

It is preferable that the convexes are disposed along circular arcs each of which has a substantially equal radius. In this structure, reflectivity characteristics similar to those obtained when the convexes are disposed substantially concentric with one another can be acquired. Moreover, since a sheet-shaped member embossed or processed by other methods is freely cut for use, reduction of the manufacturing cost can be achieved.

It is preferable that the convexes are formed by an ink et method. In this case, the convexes disposed with complex patterns can be easily produced. Moreover, since no mold is used, various types of products can be easily manufactured.

It is preferable that the convexes are formed by embossing. In this case, the convexes can be easily formed, and thus reduction of the manufacturing cost can be achieved.

A projection system according to a second aspect of the invention includes a projection engine unit which projects light in accordance with an image signal, and a screen which receives light emitted from the projection engine unit. The screen has a plurality of convexes disposed on a flat surface with a clearance left between one another. The projection engine unit applies light to the screen in a predetermined direction other than the normal line direction of the flat surface. The convexes reflect light emitted from the projection engine unit and block the light from the projection engine unit by reflecting the light such that the light cannot reach each area between the adjoining convexes on the flat surface. In this structure, a projection system used to produce an image having high contrast and high brightness when the image is displayed on a large screen from a short projection distance can be obtained.

It is preferable that each of the convexes has a reflection portion which reflects the light emitted from the projection engine unit. Reflectance of the reflection portion when reflecting the light emitted from the projection engine unit is higher than when reflecting light having a wavelength range other than the wavelength range of the light emitted from the projection engine unit. In this structure, wavelength selectivity which allows the light emitted from the projection engine unit to be efficiently reflected is obtained. Thus, light in accordance with the image signal can be efficiently reflected, and reflection of outside light can be reduced. Accordingly, an image having higher contrast and brightness can be displayed.

It is preferable that the projection engine unit and the screen are disposed in such positions that the optical axes of the projection engine unit and the screen coincide with each other. Each of the convexes is disposed substantially concentric with one another with the center of the concentric circle located at the cross point of an extension surface of the flat surface and the optical axis or in the vicinity of the cross point. In this structure, the reflectivity characteristics of the screen can be equalized, and an image having uniform brightness can be obtained.

It is preferable that the convexes are disposed with a pitch smaller than a pitch of pixels formed by light in accordance with the image signal. In this case, lowering of resolution can be reduced.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Embodiments according to the invention are hereinafter described in detail with reference to the drawings.

First Embodiment

Figure 1:
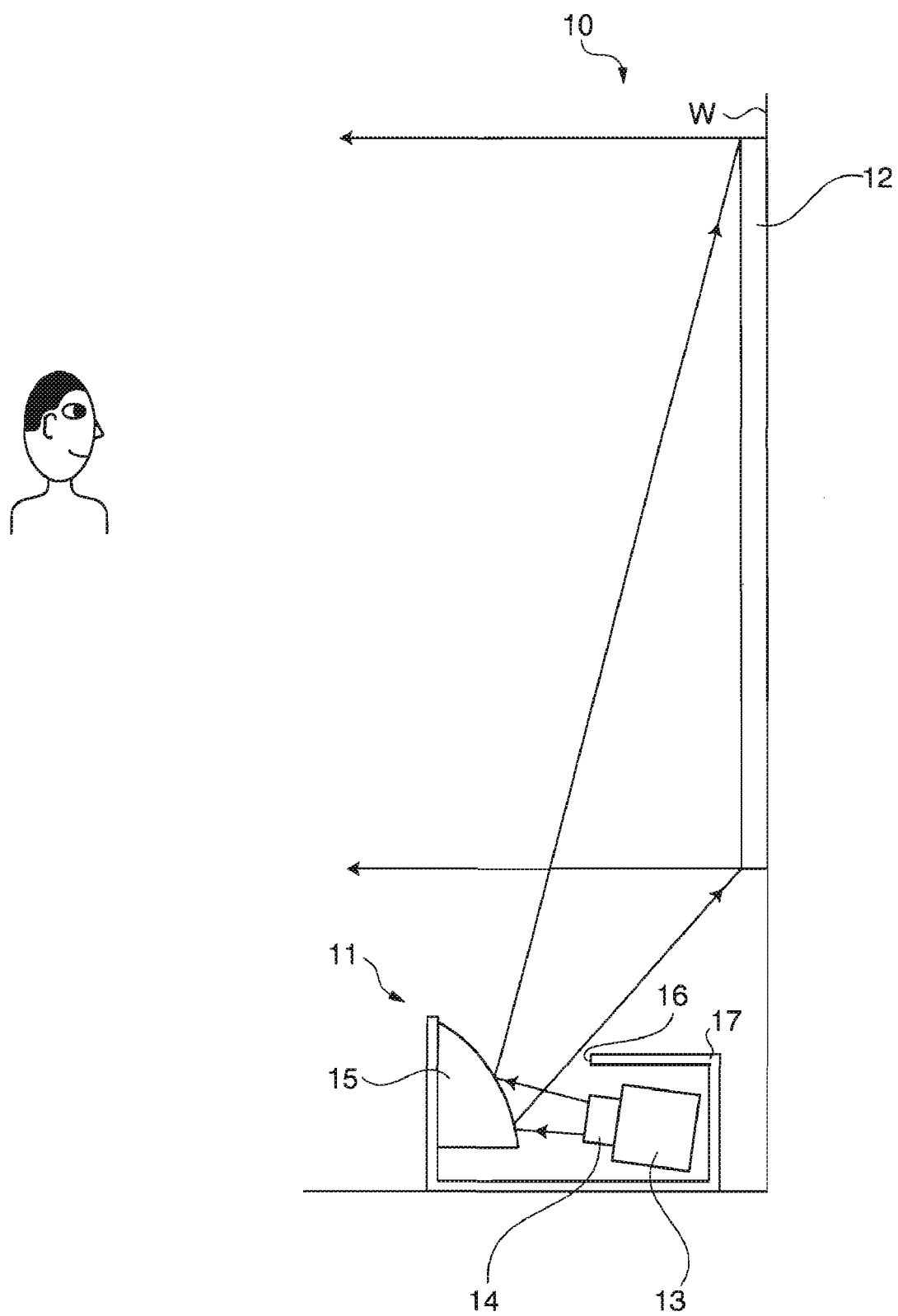
FIG. 1 schematically illustrates a structure of a projection system according to a first embodiment of the invention.

FIG. 1 schematically illustrates a structure of a projection system 10 according to a first embodiment of the invention. The projection system 10 includes a projection engine unit 11 and a screen 12. The projection engine unit 11 is a front projection type projector which projects light in accordance with an image signal. The projection engine 11 achieves close projection from a position within 1 meter such as about 30 centimeters from a wall surface W on which the screen 12 is attached. The screen 12 is a reflection type screen which reflects light emitted from the protection engine unit 11. The projection engine unit 11 has an optical engine 13, a projection lens 14, and an aspherical surface mirror 15.

Figure 2:
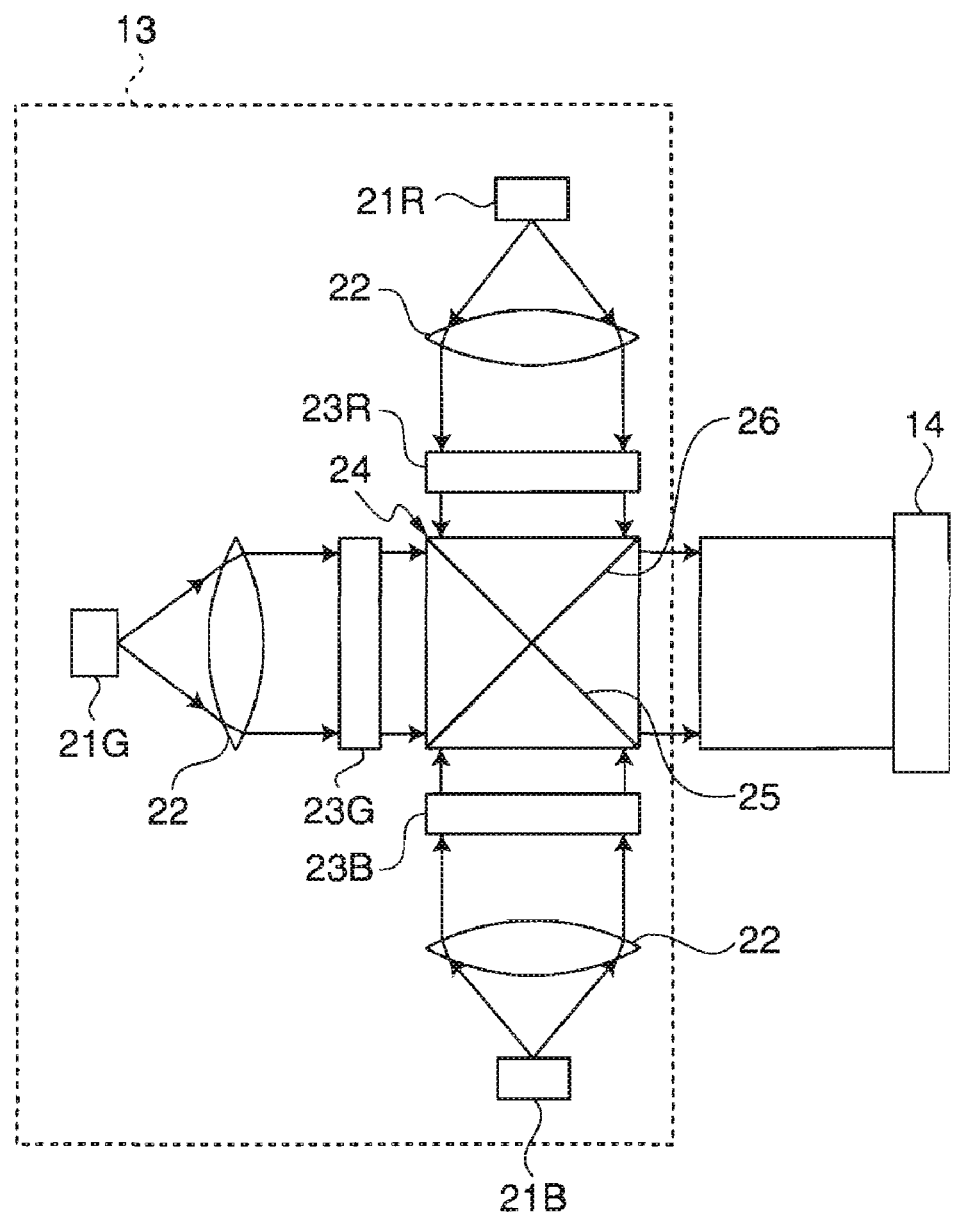
FIG. 2 schematically illustrates a structure of an optical engine.

FIG. 2 schematically illustrates the structure of the optical engine 13. An LED 21R for red (R) light as a solid light source is a light source unit for supplying R light. The R light emitted from the LED 21R for R light and collimated by a collimator lens 22 enters a spatial light modulating device 23R for R light. The spatial light modulating device 23R for R light is a transmission type liquid crystal device which modulates R light according to an image signal. The R light modulated by the spatial light modulating device 23R for R light enters a cross dichroic prism 24 as a color synthesis optical system.

An LED 21G for green (G) light as a solid light source is a light source unit for supplying G light. The G light emitted from the LED 21G for G light and collimated by the collimator lens 22 enters a spatial light modulating device 23C for C light. The spatial light modulating device 23G for G light is a transmission type liquid crystal device which modulates G light according to an image signal. The G light modulated by the spatial light modulating device 23C for 5 light enters the cross dichroic prism 24 from a side different from the side from which the R light enters the cross dichroic prism 24.

An LED 21B for blue (B) light as a solid light source is a light source unit for supplying B light. The B light emitted from the LED 21B for B light and collimated by the collimator lens 22 enters a spatial light modulating device 23B for B light. The spatial light modulating device 23B for B light is a transmission type liquid crystal device which modulates B light according to an image signal. The B light modulated by the spatial light modulating device 23B for B light enters the cross dichroic prism 24 from a side different from the sides from which the R light and the G light enter the cross dichroic prism 24. The optical engine 13 may use an equalizing optical system which equalizes light intensity distribution such as rod integrator and fly-eye lens.

The cross dichroic prism 24 has a first dichroic film 25 and a second dichroic film 26 as two dichroic films crossing each other substantially at right angles. The first dichroic film 25 reflects R light and transmits G and B lights. The second dichroic film 26 reflects B light and transmits R and G lights. The cross dichroic prism 24 synthesizes R, G and B lights entering from different sides, and releases the synthesized light toward the projection lens 14. The projection lens 14 projects the light synthesized by the cross dichroic prism 24.

The transmission type liquid crystal display device is constituted by a high temperature polysilicon (HTPS) TFT liquid crystal panel, for example. The spatial light modulating device included in the optical engine 13 is not limited to the transmission type liquid crystal display device, but may be a reflection type liquid crystal display device (liquid crystal on silicon; LCOS), DMD (digital micromirror device), GLV (grating light valve) and other devices. In addition, the spatial light modulating device need not be equipped for each color, but may be a structure for modulating light by color sequential system which sequentially supplies respective color lights to a common spatial light modulating device. The light source units included in the optical engine 13 are not limited to LEDs, but may be solid light sources other than LEDs or lamps such as extra-high pressure mercury lamp.

Returning to FIG. 1, the aspherical surface mirror 15 is disposed in such a position as to be opposed to the projection lens 14. The aspherical surface mirror 15 has a curved surface having an aspherical surface shape. The aspherical surface mirror 15 widens the angle of the light coming from the projection lens 14 chiefly in the horizontal direction by reflection. The aspherical surface mirror 15 also folds the light from the projection lens 14 such that the light travels toward an emission portion 16. The aspherical surface mirror 15 is produced by forming a reflection film on a substrate which has resin material or the like, for example. The reflection film is a layer of highly reflective material, for example, including a layer of metal material such as aluminum and a dielectric multi-layer film. It is possible to provide a protection film having transparent material on the reflection film. The aspherical surface mirror 15 which has a curved surface shape performs both folding of light and widening of light angle at the same time. Since the light angle is widened not only by the projection lens 14 but also by the aspherical surface mirror 15, size reduction of the projection lens 14 can be achieved more than the structure where the light angle is widened only by the projection lens 14. The shape of the aspherical surface mirror 15 may be modified into an appropriate shape which can correct image distortion.

The aspherical surface mirror 15 is disposed such that a part of the aspherical surface mirror 15 projects out of a housing 17. The emission portion 16 through which light coming from the aspherical surface mirror 15 to the outside of the housing 17 is a portion surrounded by an opening formed on the housing 17 and the aspherical surface mirror 15. The projection engine unit 11 may be constructed such that the respective components from the optical engine 13 to the aspherical surface mirror 15 are completely accommodated in the housing 17. A mirror for folding the optical path may be further provided between the projection lens 14 and the aspherical surface mirror 15. The projection engine unit 11 is installed on a floor surface, a desk, or a side board, for example. The projection engine unit 11 having a compact structure can easily secure an appropriate installation place.

Figure 3:
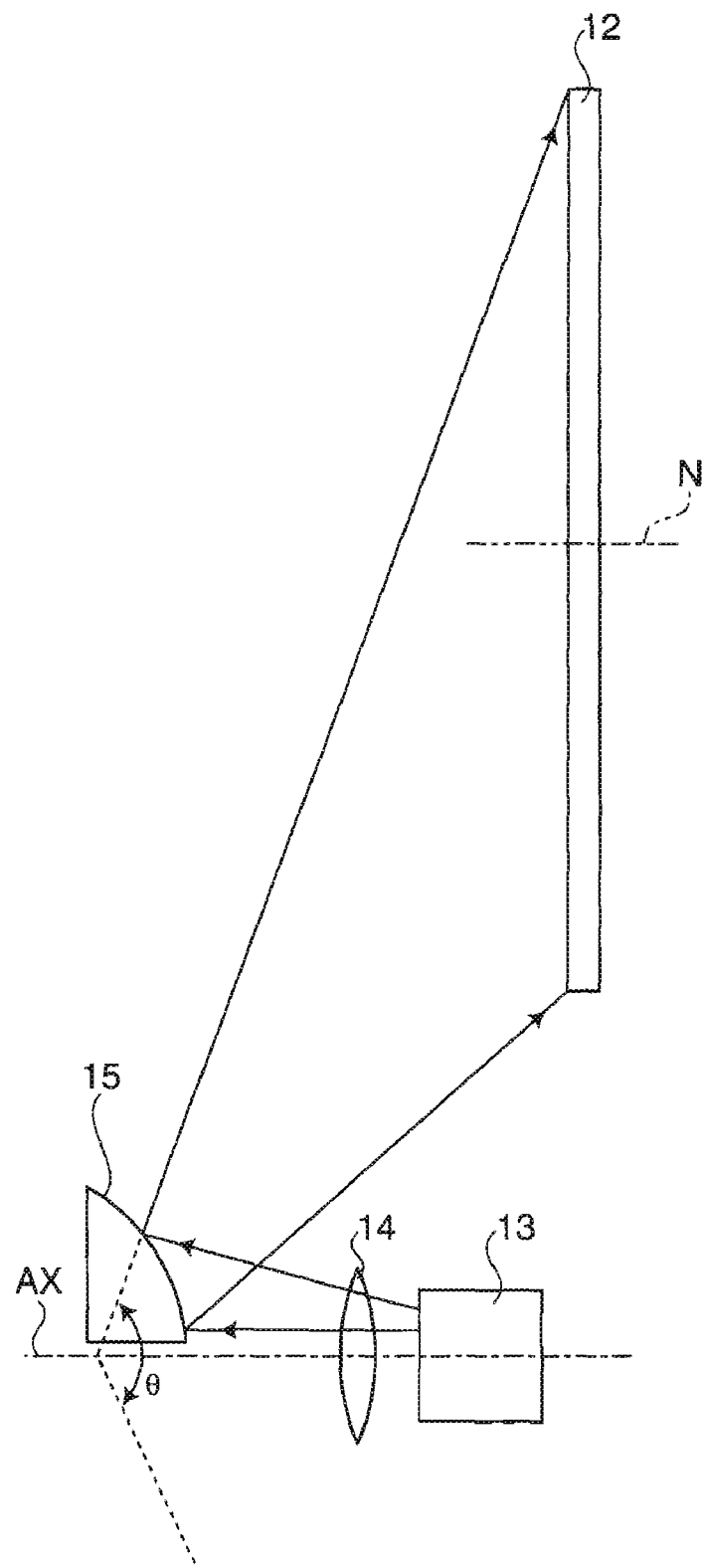
FIG. 3 shows an optical system of the projection system.

FIG. 3 illustrates an optical system of the projection system 10. The respective components of the optical engine 13, the projection lens 14, the aspherical surface mirror 15, and the screen 12 constitute a so-called co-axial optical system having a common optical axis AX. The optical engine 13, the projection lens 14, the aspherical surface mirror 15, and the screen 12 also forms a so-called shift optical system which shifts light emitted from the optical engine 13 from the optical axis AX to a particular side such that the light advances toward the particular side. By this structure, the projection engine unit 11 supplies light having a large incident angle to the screen 12. The incident angle is an angle formed between the normal line N of the screen 12 and an incident light beam. The light emitted from he projection engine 11 is a diagonal incident light reaching in a predetermined direction other than the direction of the normal line N of the screen 12. The normal line N of the screen 12 corresponds to a normal line of a flat surface which will be described later.

The projection system 10 having the co-axial optical system can use ordinary coaxial design methods. Thus, both the number of designing processes for the optical system and aberration produced in the optical system can be decreased. The aspherical surface mirror 15 may have a substantially rotation-symmetric shape with respect to the optical axis AX such as a shape of a part other than the top cut from a circular cone. Since the aspherical surface mirror 15 has a substantially rotation-symmetric shape with respect to the optical axis AX, the optical axis of the aspherical surface mirror 15 can be easily aligned with the optical axes of other structures. Moreover, the aspherical surface mirror 15 having an axis-symmetric asoherical surface shape can be processed by simple methods such as lathing. Thus, the aspherical surface mirror 15 can be easily and highly accurately manufactured.

The projection system 10 having the projection lens 14 and the aspherical surface mirror 15 employs extra-wide-angle optical system having a wide angle θ of at least 150 degrees such as 160 degrees. Since the projection system 10 adopts the shift optical system which uses only a part of an angle range of highly widened light, equalization of the light traveling direction can be achieved. The angle of light reaching the screen 12 from the projection engine unit 11 lies within a predetermined angle range not including the direction of the normal line N of the screen 12. According to this embodiment, the minimum incident angle is 70 degrees and the maximum incident angle is 80 degrees with respect to the screen 12. Since the shift optical system is employed, the angle difference of lights reaching the screen 12 can be decreased to 10 degrees or smaller.

Figure 4:
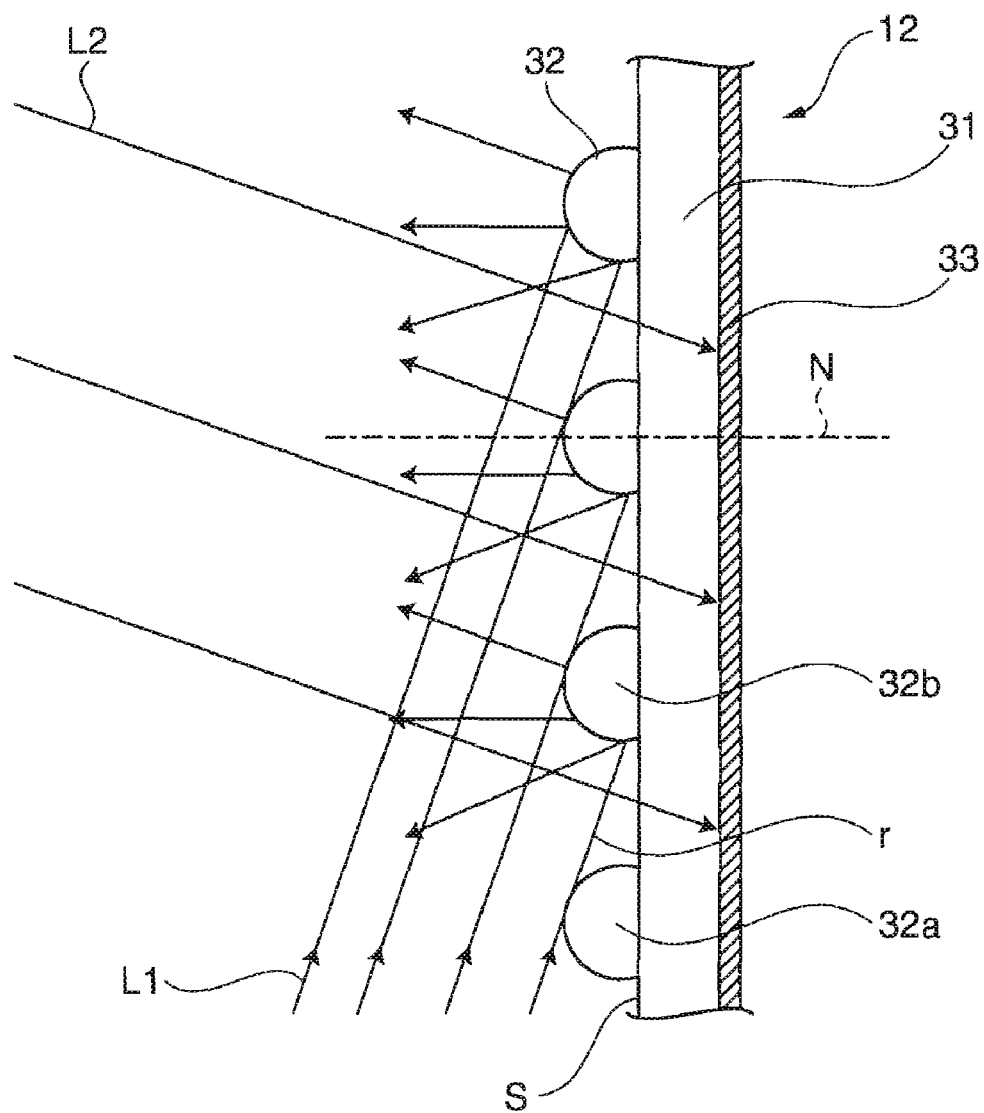
FIG. 4 is a cross-sectional view showing a structure of a main part of a screen.

FIG. 4 is a cross-sectional view of a main part of the screen 12. A substrate 31 is a plastic sheet or other types of parallel flat plate made of transparent material such as resin. The substrate 31 transmits light. The substrate 31 has a plurality of convexes 32 on a flat surface S on the light entrance side. The respective convexes 32 are disposed with a clearance left between one another. The cross section shown in the figure contains the normal line N of the flat surface S and the optical axis AX (not shown). Each of the convexes 32 has a cross-sectional shape as a part of a circle cut by a straight line.

Figure 5:
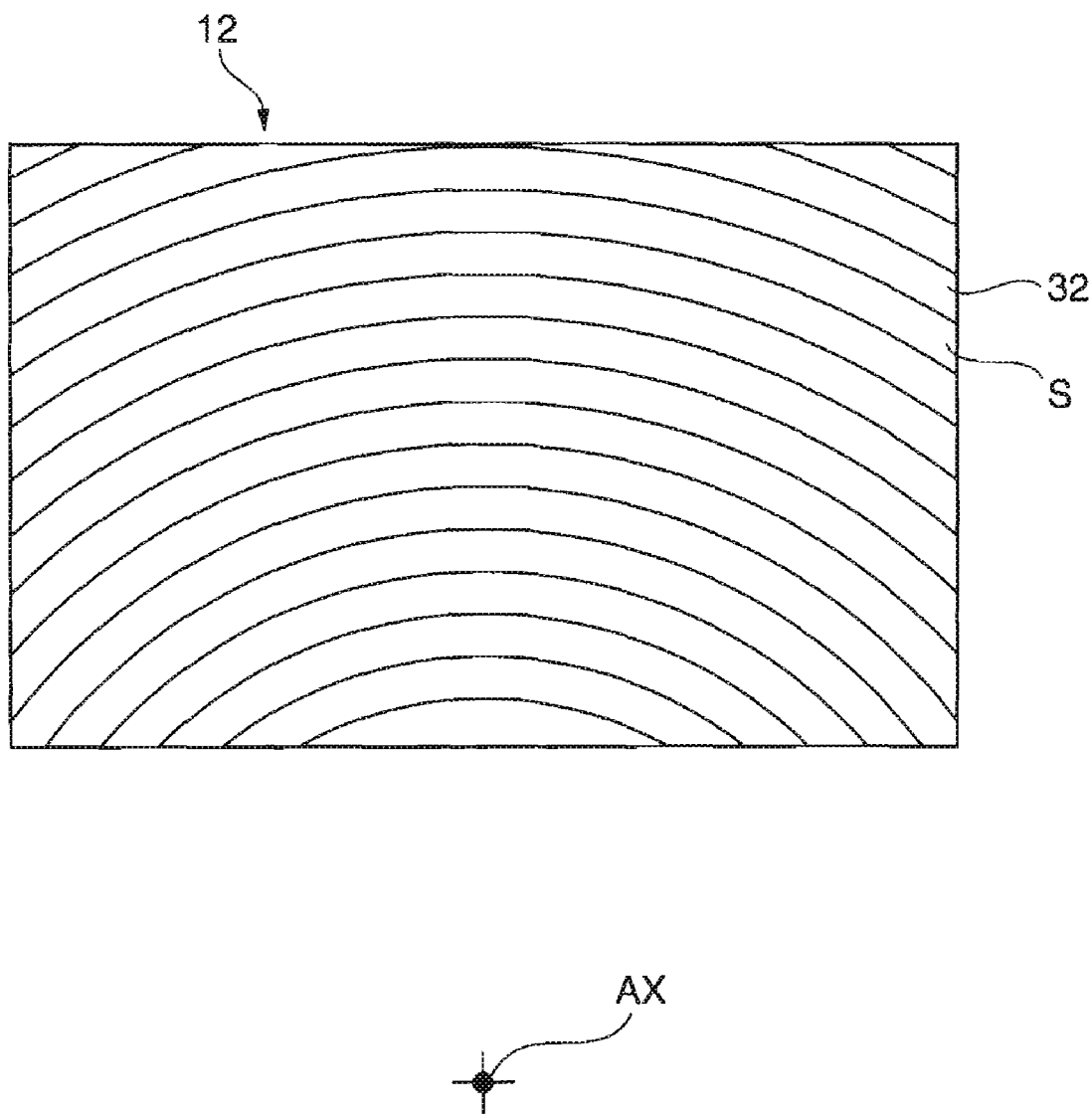
FIG. 5 is a plan view showing a structure of the screen.

FIG. 5 is a plan view showing the structure of the screen 12 as viewed from the light entrance side. The convexes 32 are disposed substantially concentric with one another. The centers of the concentric circles of the convexes 32 are positioned at a cross point of a surface extending from the flat surface S and the optical axis AX. Each of the convexes 32 has a shape whose longitudinal direction corresponds to a direction along a circular arc of a circle whose center is located at the optical axis AX. The direction along the circular arc of the circle whose center is located at the optical axis AX corresponds to a first direction. The convexes 32 are disposed in a direction along a radius of the circle whose center is located at the optical axis AX. The direction along the radius of the circle whose center is located at the optical axis AX corresponds to a second direction orthogonal to the first direction. The center of the concentric circle of each convex 32 may be located at a position near the cross point of the surface extending from the flat surface S and the optical axis AX. Each of the convexes 32 has a curved surface which is substantially flat in the first direction and has a curvature in the second direction.

Figure 6:
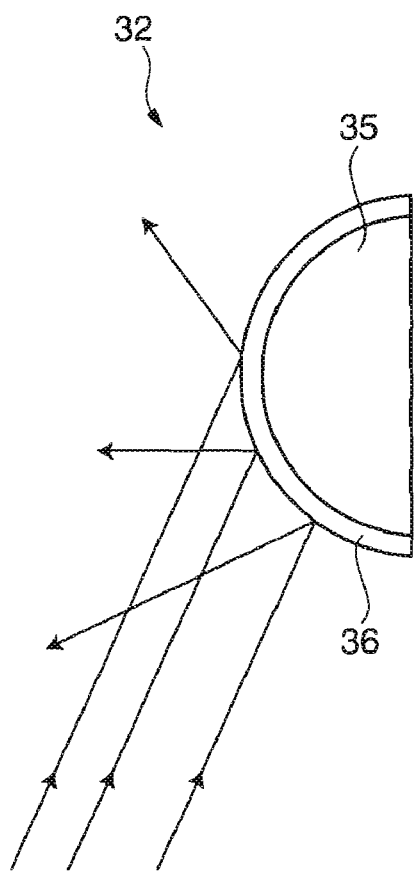
FIG. 6 is a cross-sectional view showing a structure of a convex.

FIG. 6 is a cross-sectional view showing the structure of each convex 32. The convex 32 has a reflection portion 36 covering the substrate 35. At the reflection portion 36, the convex 32 reflects light emitted from the projection engine unit 11 (see FIG. 1). The substrate 35 is produced by using resin material such as ultraviolet ray hardening resin and foaming ink. The reflection portion 36 contains highly reflective material. The reflection portion 36 is produced by applying white painting or silver painting. The convex 32 having a curved surface can diffuse light emitted from the projection engine unit 11. The cross section shown in the figure crosses the first direction at right angles. The convex 32 has substantially the same cross-sectional structure shown in the figure at any position in the first direction. The cross-sectional structure of the convex 32 is not limited to a shape equivalent to a part of a circle, but may be a shape equivalent to a part of an ellipse or other shapes. The convex 32 may be formed by forming the reflection portion 36 on the substrate 35 or may be produced by using other highly reflective materials such as milky semi-transparent) materials.

Light coming from the projection engine unit 11 can be reflected toward the front of the screen 12 by the convexes 32 having the above structure. Since the convexes 32 are arranged substantially concentric with one another, the light from the projection engine unit 11 can be uniformly reflected by the screen 12. Thus, the reflective characteristics of the screen 12 are equalized, and an image having uniform brightness can be obtained. Since the convexes 32 having the longitudinal direction are formed, an image having uniform brightness can be easily produced. Moreover, the convexes 32 having the longitudinal direction can be manufactured by a simplified method.

Figure 7:
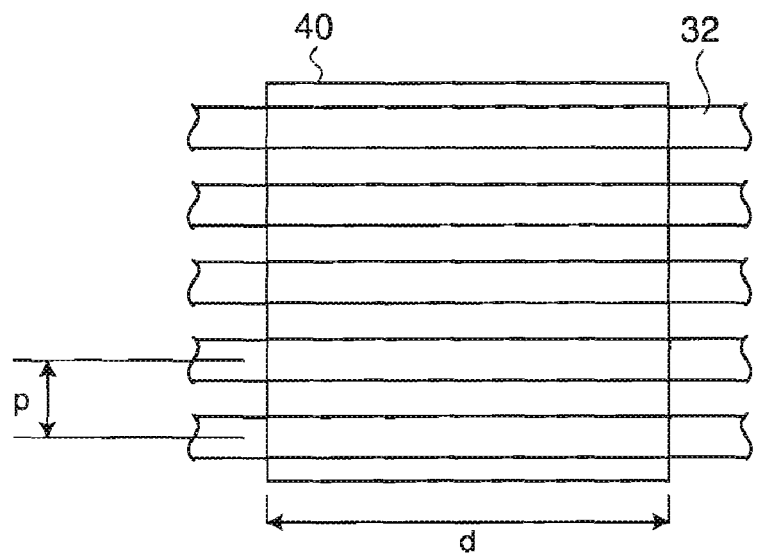
FIG. 7 shows the relationship between the convex structure and pixel size.

FIG. 7 shows the relationship between the structure of the convexes 32 and the size of pixels 40. The convexes 32 are disposed with a pitch smaller than that of the pixels 40 formed on the screen 12 by the light supplied from the projection engine unit 11. It is preferable that the plural convexes 32 are contained in one pixel 40, when a side d of a pixel is 0.7 mm, for example, a pitch p of the convexes 32 is 0.14 mm. In this case, five convexes 32 are contained in one pixel 40. Since the convexes 32 are arranged with the pitch p smaller than the pitch of the pixels 40, lowering of resolution can be reduced. It is preferable that the pitch p of the convexes 32 is one fifth of the pitch of the pixels 40 or smaller.

Returning to FIG. 4, an anti-reflection member 33 is provided on the wall surface W (see FIG. 1) of the substrate 31 opposite to the side where the convexes 32 are provided. The anti-reflection member 33 covers the entire area of the wall surface W of the substrate 31. The anti-reflection member 33 absorbs light having passed through the substrate 31 to reduce reflection of the light having passed through the substrate 31. The anti-reflection member 33 contains light absorbing material. The anti-reflection member 33 is produced by applying mat black painting, for example.

Light L1 emitted from the projection engine unit 11 and reflected by the convexes 32 diffuses within a predetermined range around the normal line N. Thus, preferable visibility angle characteristics can be obtained. Since the light L1 coming from the projection engine unit 11 has a large incident angle, a beam r having passed through the vicinity of one convex 32a reaches another convex 32b positioned next to the one convex 32a, for example. Thus, the light L1 from the projection engine unit 11 is reflected only by the convexes 32 of the screen 12. Accordingly, the screen 12 can be so designed as to reflect the light L1 coming from the projection engine unit 11 only by the convexes 32 by appropriately determining the heights and intervals of the convexes 32.

Since the light L1 emitted from the projection engine unit 11 enters diagonally from a predetermined direction, shadows of the convexes 32 are cast on the flat surface S at the areas between the adjoining convexes 32. The convexes 32 constructed to reflect the light L1 coming from the projection engine unit 11 block the light L1 such that the light L1 cannot reach the areas between the adjoining convexes 32 on the flat surface S. Outside light L2 having passed through the flat surface S in the areas between the adjoining convexes 32 passes through the substrate 31 and reaches a rear anti-reflection member 33. The rear anti-reflection member 33 absorbs the outside light L2 to reduce reflection of the outside light L2. The rear anti-reflection member 33 can reduce reflection of the outside light L2 reaching the areas between the adjoining convexes 32 at any angles.

According to this embodiment, angle selectivity or efficiently reflecting the light L1 emitted from the projection engine unit 11 can be obtained. Moreover, the light L1 from the projection engine unit 11 can be efficiently directed toward the audience. Thus, light according to an image signal can travel toward the audience with high efficiency during close projection, allowing a bright image to be displayed. Moreover, contrast increases by reducing reflection of the outside light L2, providing an advantage that a high-contrast and bright image can be displayed on a large screen from a short projection distance. Since the amount of the projection light need not be increased even Linder the environment containing a plenty of the outside light L2, reduction of power consumption can be achieved.

It is now assumed that the following conditions have been established. The reflectance of the convexes 32 is 80%. The reflectance of the anti-reflection member 33 is 9%. The area ratio of the region having the convexes 32 to the region other than the region having the convexes 32 in the flat surface S is 1:3. Since the light L1 emitted from the projection engine unit 11 only reaches the convexes 32, the average reflectance for the reflection of the light L1, coming from the projection engine unit 11 is 80%. The outside light L2 uniformly reaches the entire area of the flat surface S. The average reflectance for the reflection of the outside light L2 is calculated by the equation: $80\% \times 0.25 + 9\% \times 0.75 = 26.75\%$.

Thus, the screen 12 can decrease the effect of the outside light L2 to about one third of the effect of the light L1 coming from the projection engine unit 11. For example, a projector having a lighted room contrast of 100:1 under a certain condition can obtain contrast of about 300:1.

Figure 8:
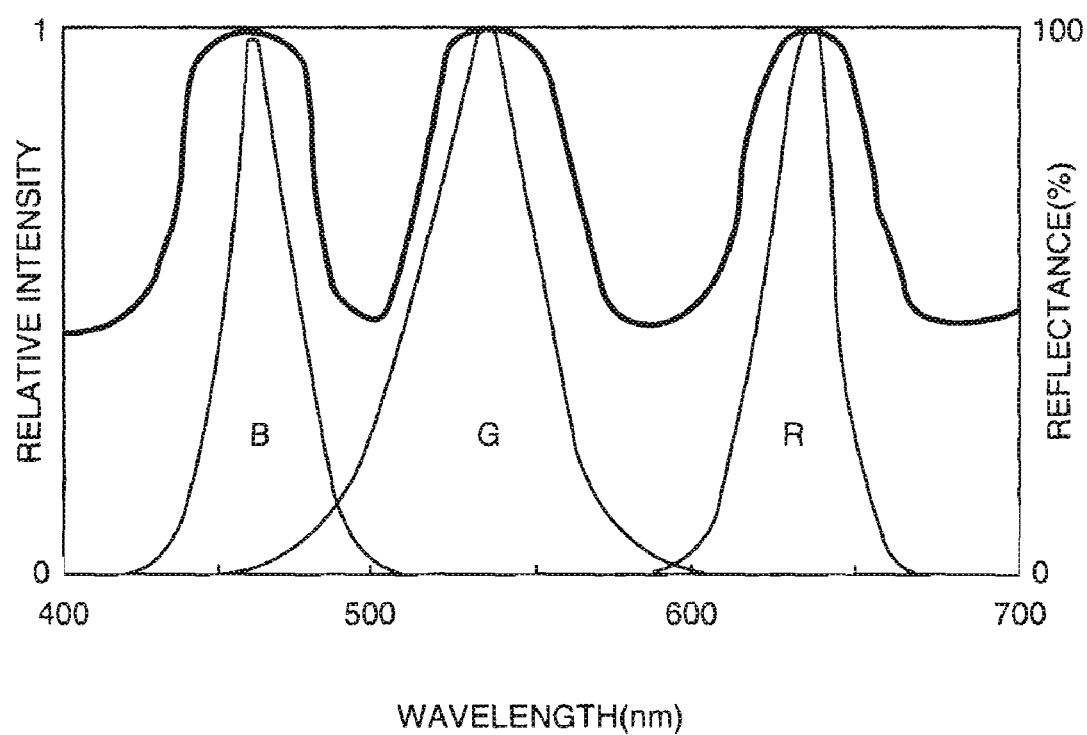
FIG. 8 shows reflection characteristics of a reflection portion.

The convexes 32 may have a structure which exhibits higher reflectance when reflecting the light L1 from the projection engine unit 11 than that when reflecting light having a wavelength range other than the wavelength range of the light L1 from the projection engine unit 11. The reflection portion 36 can be produced by using color material having wavelength selectivity for selectively reflecting the light L1 coming from the projection engine unit 11. It is herein assumed that the respective color lights emitted from the LED 21R for red (R) light, the LED 21G for green (G) light, and the LED 21B for blue (B) light (see FIG. 2) of the optical engine 13 have wavelength ranges indicated by R, G, and B shown in FIG. 8, respectively. In this figure, the horizontal axis indicates wavelength, the left vertical axis indicates relative intensity, and the right vertical axis indicates reflectance of the reflection portion 36. As shown by a bold line in the figure, the reflection portion 36 has such reflection characteristics that exhibit high reflectance such as about 100% in the vicinity of the respective peak wavelengths in the R, G and B ranges.

The screen 12 having this wavelength selectivity can efficiently reflect the light L1 coming from the projection engine unit 11 and reduce reflection of the outside light L2. Thus, a further high contrast and bright image can be displayed. For providing e wavelength selectivity of the screen 12, color lights having wavelength ranges limited to some extent need to be supplied from a light source unit. Thus, the structure capable of providing wavelength selectivity of the screen 12 is appropriately used in combination with a solid light source or a laser beam source which can supply color lights having narrow wavelength ranges.

It is preferable that the anti-reflection member 33 can reduce reflection of lights having as broad wavelength ranges as possible. The outside light L2 such as sunray, light from a fluorescent lamp, and light from an incandescent lamp has a relatively wide wavelength range. Since the anti-reflection member 33 capable of reducing reflection of lights having wide wavelength ranges is used, reflection of the outside light L2 can be effectively decreased. In such a case where the outside light L2 having a wavelength range limited to some extent enters, the anti-reflection member 33 may have wavelength selectivity corresponding to the wavelength characteristics of the outside light L2.

Figure 9:
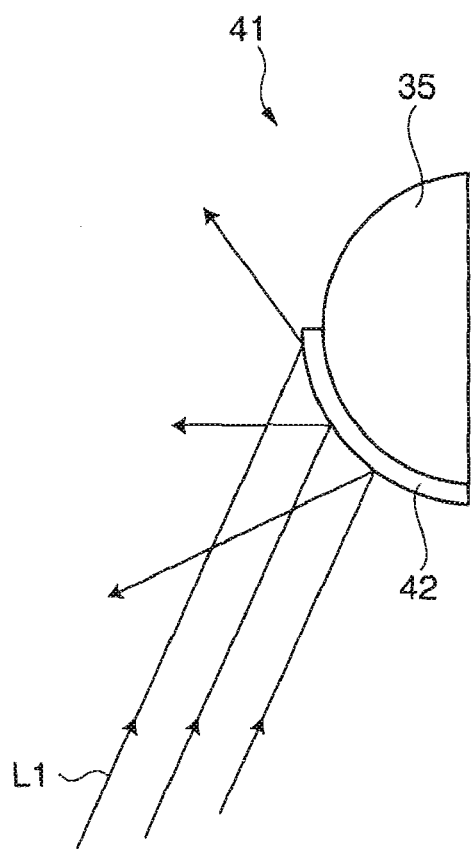
FIG. 9 illustrates a convex in a modified example.
Figure 10:
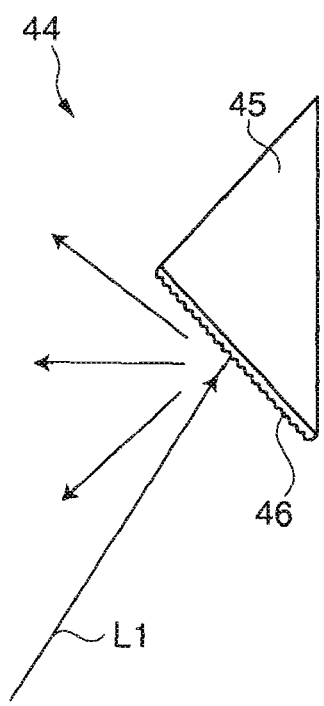
FIG. 10 illustrates a convex in another modified example

FIGS. 9 and 10 illustrate modified examples of the convex. While the convex 32 discussed above (see FIG. 6) has the reflection portion 36 provided on the entire curved surface, a convex 41 shown in FIG. 9 has a reflection portion 42 provided on a part of the curved surface. The reflection portion 42 is disposed on the area receiving the light L1 from the projection engine unit 11. Thus, the reflection portion 42 guides the outside light L2 entering the area other than the area having the reflection portion 42 on the convex 41 toward the anti-reflection member 33, and further reduces reflection of the outside light L2. Moreover, the reflection portion 42 requires a smaller amount of white painting or the like at the time of production of the reflection portion 42.

A convex 44 shown in FIG. 10 has a cross section of an isosceles triangle shape. A reflection portion 46 is provided on a surface of a substrate 45 on the side receiving the light L1 from the projection engine 11. The reflection portion 46 having small convexes and concaves reflects the light L1 coming from the projection engine unit 11 and also diffuses the light L1 on the audience side. Thus; preferable visibility angle characteristics can be obtained. Similar small concaves and convexes may be formed on the reflection portions 36 and 42 of the convexes 32 and 41. The cross-sectional shapes of the convexes are not limited to the shapes discussed in these specific examples, but appropriate modifications may be given to those. For example, the cross-sectional shapes of the convexes may be rectangular shapes or polygonal shapes.

Figure 11:
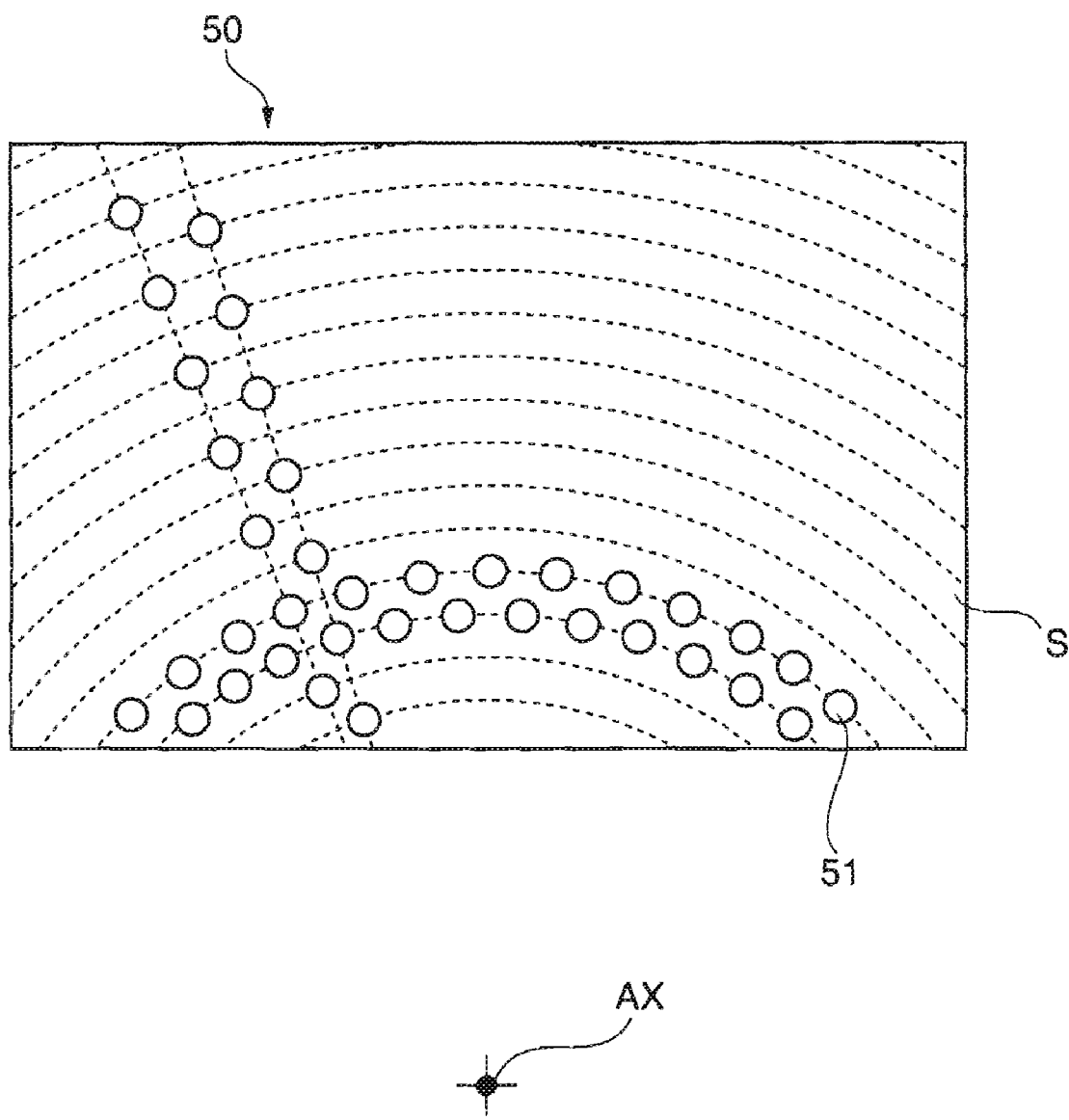
FIG. 11 is a plan view showing a structure of a screen having dot-shaped convexes.

FIG. 11 is a plan view showing a structure of a screen 50 having dot-shaped convexes 51. Each of the convexes 51 is disposed in a direction along a circular arc of a circle whose center is located at the optical axis AX, and in a direction along a radius of a circle whose center is located at the optical axis AX. The direction along the circular arc of the circle whose center is located at the optical axis Ax corresponds to the first direction. The direction along the radius of the circle whose center is located at the optical axis Ax corresponds to the second direction orthogonal to the first direction. The convexes 51 are provided on the entire surface of the screen 50. Here, a part of the convexes 51 are not shown in the figure. Each of the convexes 51 has a shape as a part of aspherical surface cut by a flat surface. Each of the convexes 51 has a curved surface having curvature in both the first and second directions.

The screen 50 having the convexes 51 arranged substantially concentric with one another can uniformly reflects the light coming from the projection engine unit 11. The convexes 51 are disposed substantially at the constant intervals in the concentric direction. The convexes 51 are alternately positioned with respect to the adjoining circular arcs. The convexes 51 are disposed substantially at the constant intervals also in the radial directions of the concentric circle. One convex 51 is provided on every two circular arc lines in the radial direction of the concentric circle. In this structure, the arrangement pattern of the dot-shaped convexes 51 can be provided with randomicity. Since the arrangement pattern of the convexes 51 is random, moire effect can be decreased.

Figure 12:
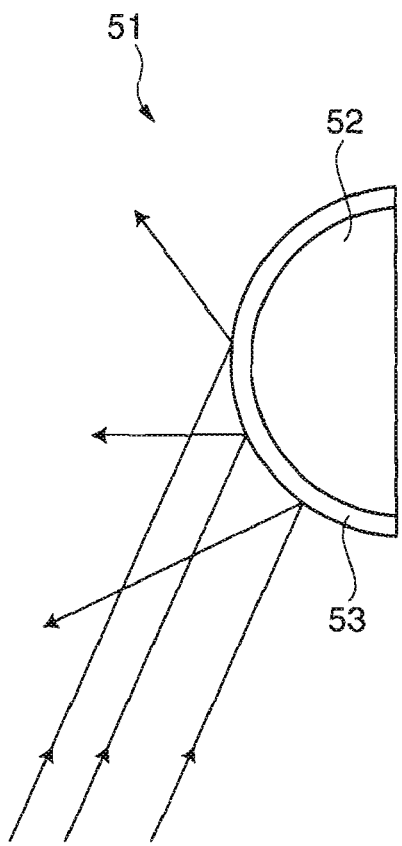
FIG. 12 is a cross-sectional view showing a structure of a convex.

FIG. 12 illustrates a cross-sectional structure of the convex 51. The convex 51 having the cross-sectional structure shown in the figure has a cross-sectional shape as a part of a circle cut by a straight line. The convex 51 has a substrate 52 and a reflection portion 53. The structure of the convex 51 has a structure similar to that of the convex 32 discussed above (see FIG. 6) except for a different shape. The convex 51 has the same structure on any cross sections including the center line. By the presence of the convex 51, the light coming from the projection engine unit 11 can be reflected toward the front of the screen 12. Since the convex 51 has a curved surface having curvatures in two directions, the light from the projection engine unit 11 can be diffused in two directions. The cross-sectional structure of the convex 51 is not limited to a shape equivalent to a part of a circle, but may be a shape equivalent to an ellipse or other shapes.

Figure 13:
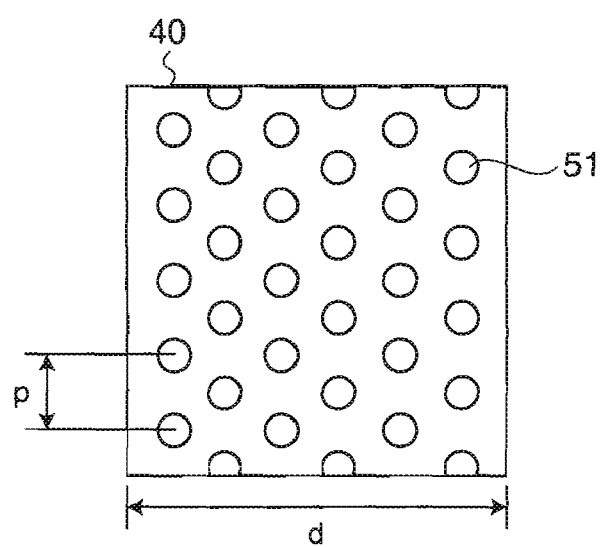
FIG. 13 shows the relationship between the convex structure and pixel size.
Figure 14:
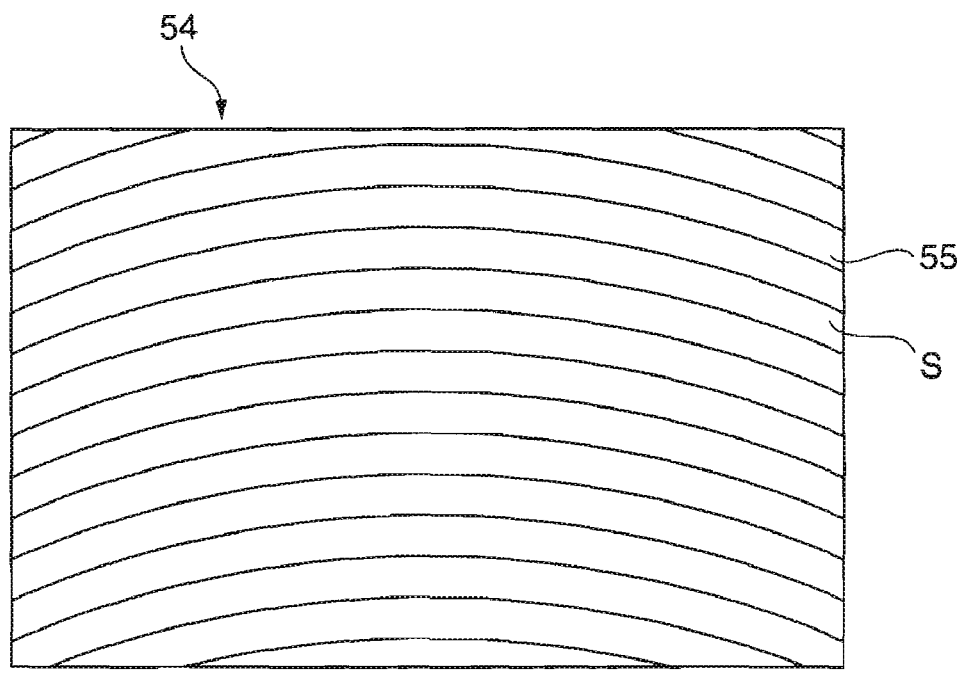
FIG. 14 illustrates a structure having convexes disposed along circular arcs each of which has a substantially equal radius.

FIG. 13 shows the relationship between the structure of the convexes 51 and the size of the pixels 40. The convexes 51 are disposed with a pitch smaller than that of the pixels 40. It is preferable that the plural convexes 51 are contained in one pixel 40. When one side d of the pixel is 0.7 mm, for example, a pitch p of the convexes 51 is 0.4 mm. In this case, thirty convexes 51 are contained in one pixel 40. By disposing the convexes 51 with the pitch p smaller than the pitch of the pixels 40, lowering of resolution can be reduced. The pitch p of the convexes 51 is preferably one fifth of the pitch of the pixels 40 or smaller.

The convexes according to these examples can be produced by using an ink jet method or a screen printing method. When the ink jet method is used, the convexes arranged with complex patterns can be easily formed. When the ink jet method requiring no mold is employed, various types of products can be easily manufactured. The screen printing method is appropriate for mass production of screens. Since the plastic sheet used for the substrate 31 (see FIG. 4) has a smooth surface, the convexes can be easily formed. Moreover, the plastic sheet used as the substrate 31 can transmit light.

The structure of the screen is not limited to the structure having the convexes arranged substantially concentric with one another. For example, a screen 54 having convexes 55 disposed along circular arcs each of which has a substantially equal radius may be used. The convexes 55 have the longitudinal direction corresponding to the first direction. The convexes 55 disposed along the circular arcs having a substantially equal radius have a structure similar to that of the convexes arranged substantially concentric with one another, and therefore can provide reflectivity characteristics similar to those of the convexes arranged substantially concentric with one another. Each of the convexes 55 may be positioned along a part of a substantially equal ellipse. The shapes of the convexes 55 are not limited to those having the longitudinal direction corresponding to the first direction, but may be dot-shaped similarly to the convexes 51 discussed above see FIG. 11).

The convexes of the screen are not limited to those provided on the substrate, but may be convexes produced by deforming a sheet-shaped material. For example, a screen 60 shown in FIG. 15 has convexes 61 produced by deforming a sheet-shaped member 62. The sheet-shaped member 62 is deformed by embossing, for example. The sheet-shaped member 62 is a light absorbing material such as a sheet colored with black painting, for example.

The convexes 61 are formed by applying white painting, color material having wavelength selectivity, or other paintings to areas of the sheet-shaped member 62 raised by deformation. The convexes 61 have the longitudinal direction corresponding to the first direction similarly to the convexes 32 discussed above (see FIG. 5) The convexes 61 have curved surfaces similar to those of the convexes 32 (see FIG. 6). The light emitted from the projection engine unit 11 can be efficiently reflected by the convexes 61. The shapes of the convexes 61 are not limited to those having the longitudinal direction corresponding to the first direction, but may be dot-shaped similarly to the convexes 51 discussed above (see FIG. 11).

Each area between the adjoining convexes 61 on the sheet-shaped member 62 absorbs outside light. Each area between the adjoining convexes 61 on the sheet-shaped member 62 functions as an anti-reflection member. Accordingly, reflection of outside light can be reduced by the sheet-shaped member 62, and therefore a high-contrast and bright image can be displayed. The screen 60 may have a substrate for supporting the sheet-shaped member 62, for example, in addition to the sheet-shaped member 62.

The substrate 31 of the screen 12 shown in FIG. 4 may also be constituted by a light absorbing material. In this case, each area between the adjoining convexes 32 on the substrate 31 functions as an anti-reflection member. The anti-reflection function of the substrate 31 allows display of a high-contrast and bright image. The anti-reflection function of the substrate 31 also eliminates the necessity for applying light absorbing material to the wall, surface W side surface of the substrate 31.

Figure 15:
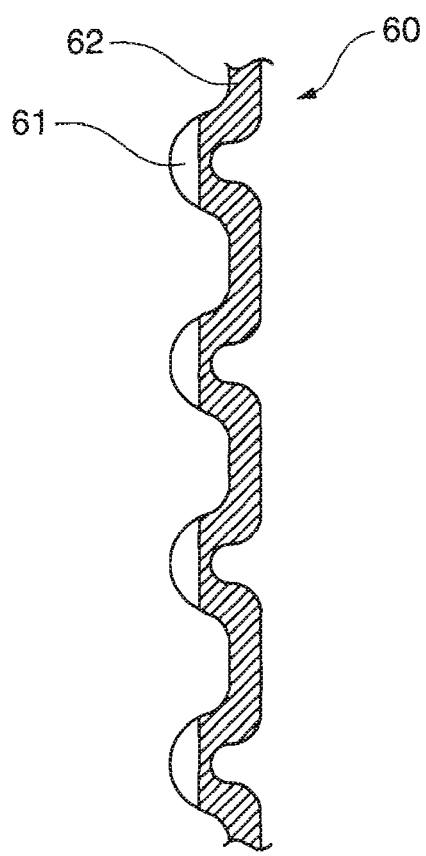
FIG. 15 illustrates a structure having convexes formed by deforming a sheet-shaped member.
Figure 16:
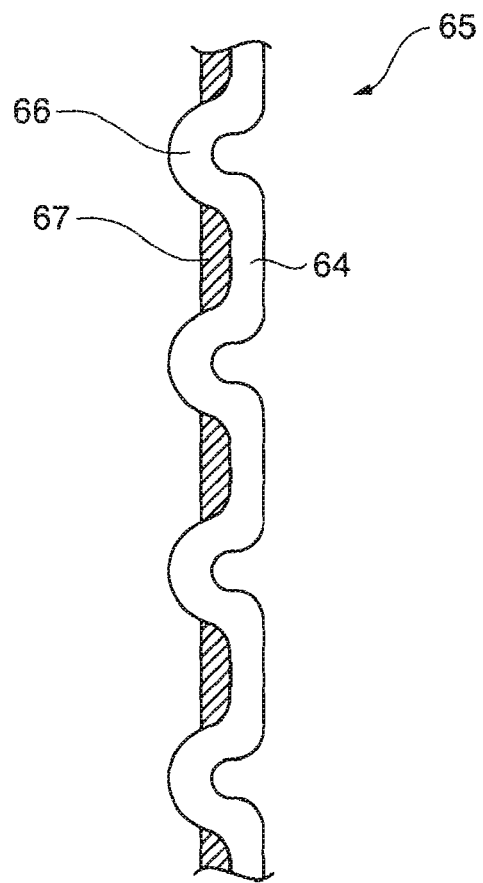
FIG. 16 illustrates another structure having convexes formed by deforming a sheet-shaped member.

A screen 65 shown in FIG. 16 has convexes 66 produced by deforming a sheet-shaped member 64 in a similar manner to the case of the screen 60 shown n FIG. 15. The sheet-shaped member 64 is a material having high reflectivity such as a sheet colored with white painting, for example. The raised portions of the sheet-shaped member 62 can be used as the convexes 61. Each area between the adjoining convexes 61 on the sheet-shaped member 64 has an anti-reflection member 67. The anti-reflection member 67 is produced by applying mat black painting, for example. This structure allows display of a high contrast and bright image similarly to the above example.

Each area of the adjoining convexes 32 on the flat surface S of the screen 12 shown in FIG. 4 may also have the anti-reflection member. In this case, reflection of the outside light reaching the area between the adjoining convexes 32 can be reduced similarly to the above example. In addition, the necessity for applying light absorbing material to the wall surface W side surface of the substrate 31 can be eliminated. For forming the anti-reflection member on the flat surface S, the substrate 31 may be constituted by an opaque material such as paper and cloth instead of a transparent material.

Figure 17:
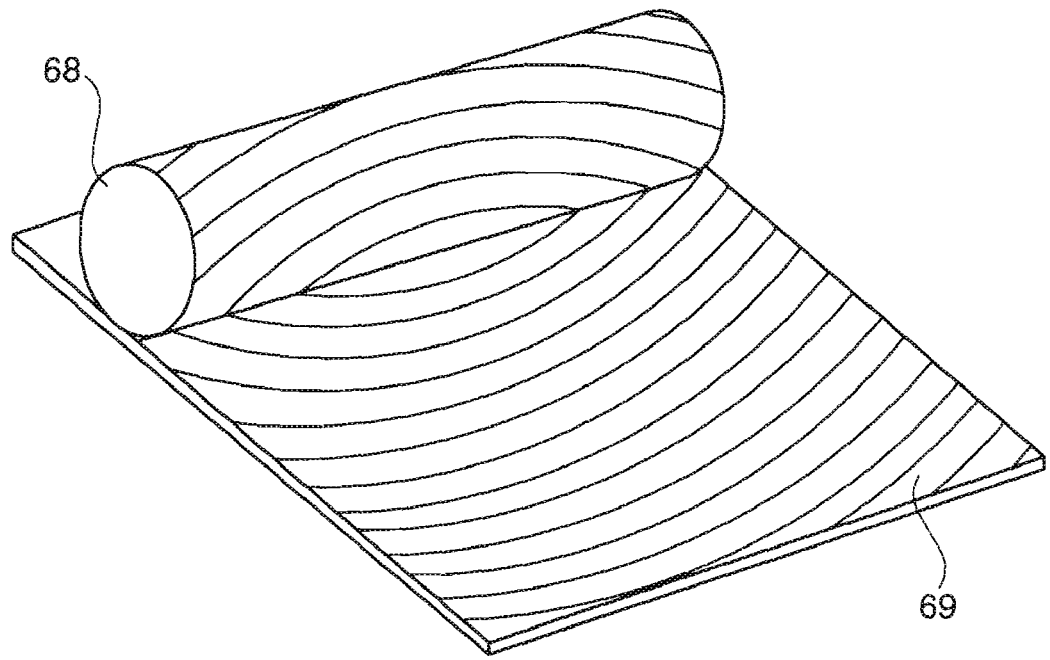
FIG. 17 shows an embossing method which uses a roll mold.

Embossing capable of easily forming convexes is useful for mass production of screens. When embossing is used to produce convexes, a roll mold 68 having concaves and convexes shown in FIG. 17 may be used. By rolling the roll mold 68 while pressing it against a sheet-shared member 69, convexes can be easily produced. In case of the structure having the convexes disposed along circular arcs each of which has a substantially equal radius, the embossed sheet member 69 can be freely cut for use. In this case, the manufacturing cost can be reduced by using the embossing method. The roll mold 68 can be applied to either the convexes which have the longitudinal direction corresponding to the first direction, or the dot-shaped convexes.

Second Embodiment

Figure 18:
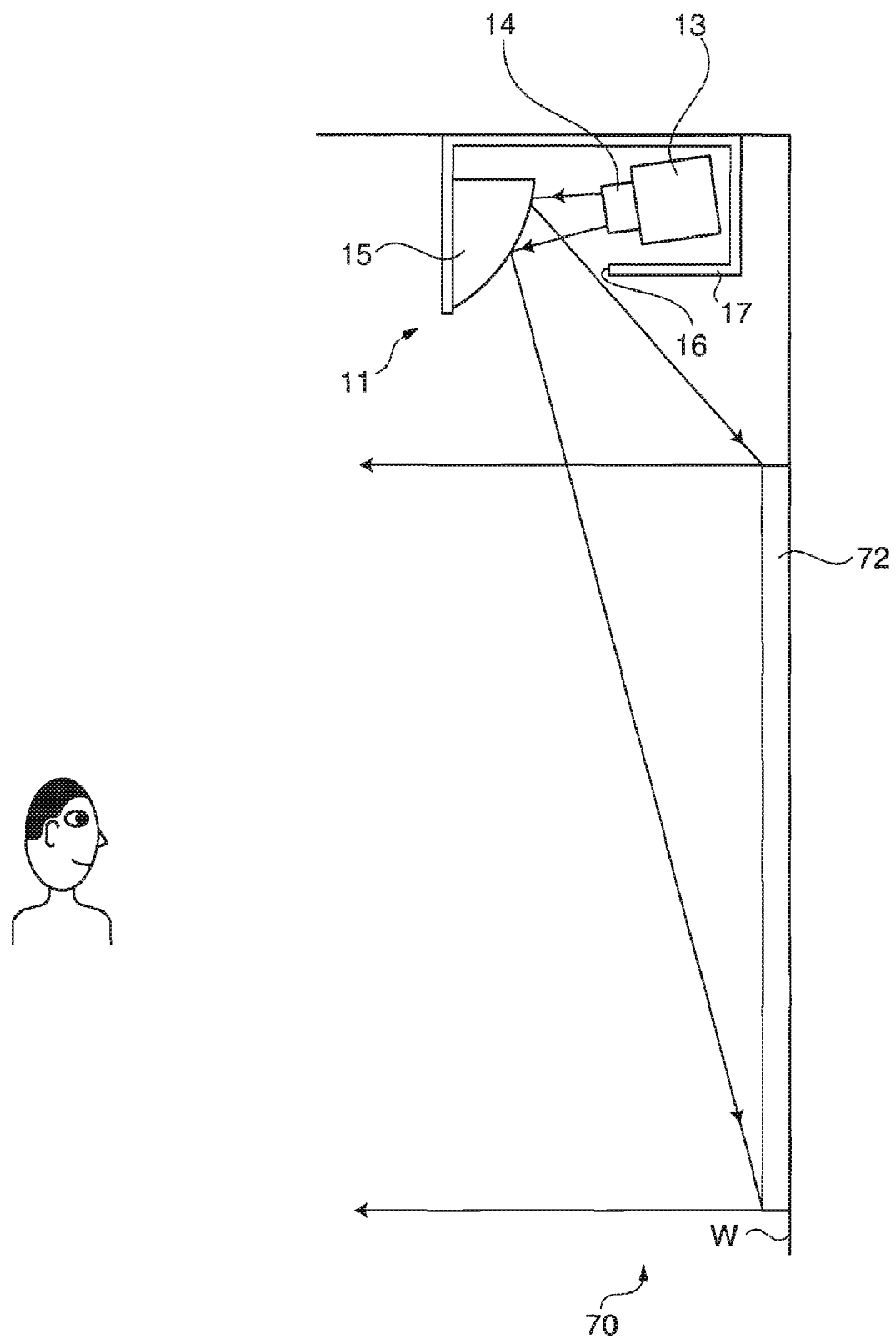
FIG. 18 schematically illustrates a structure of a projection system according to a second embodiment of the invention.

FIG. 18 schematically illustrates a projection system 70 according to a second embodiment of the invention. The projection system 70 in this embodiment has an upside-down structure of that of the projection system 10 in the first embodiment. The projection system 70 in this embodiment projects light from vertically above a screen 72. The projection engine unit 11 is suspended from a ceiling surface, for example. The projection engine unit 11 used in the first embodiment is disposed upside down in this embodiment.

The screen 72 has the upside-down structure of the screen 12 used in the first embodiment. According to this embodiment, a high contrast and bright image can be displayed during close projection similarly to the first embodiment. The structure of the projection system is not limited to the upside-down structure of the projection system 10 in the first embodiment, but may be a structure rotated through 90 degrees The screens in the respective embodiments are not limited to those used in combination with a particular projection engine unit to constitute a projection system, but may be used with any types of projector.

Accordingly, the screen according to these embodiments are useful particularly when used in combination with a projector which projects light from a position close to a screen.

The entire disclosure of Japanese Patent Application NOs: 2006-279506, filed Oct. 13, 2006 and 2007-203867, filed Aug. 6, 2007 are incorporated by reference herein.

What is claimed is:

1. A screen having an image projected thereon, the image having a plurality of image pixels, comprising:

a plurality of convexes disposed on a flat surface with a clearance left between one another, wherein, the convexes reflect diagonal incident light coming in a predetermined direction other than the normal line direction of the flat surface, and block the diagonal incident light by reflecting the incident light such that the incident light cannot reach each area between the adjoining convexes on the flat surface, and the screen has a pitch of the plurality of convexes being equal to or less than one fifth of a pitch of the plurality of image pixels.

2. The screen according to claim 1, wherein each of the convexes has a reflection portion which reflects the diagonal incident light.

3. The screen according to claim 1, further comprising:
a substrate which has the flat surface and transmits light; and
an anti-reflection member provided on the side of the substrate opposite to the side having the convexes to reduce reflection of light.

4. The screen according to claim 1, further comprising an anti-reflection member provided between the adjoining convexes to reduce reflection of light.

5. The screen according to claim 1, wherein the convexes diffuse the diagonal incident light.

6. The screen according to claim 1, wherein the convexes are so shaped as to have the longitudinal direction corresponding to a first direction, and are arranged in a second direction orthogonal to the first direction.

7. The screen according to claim 6, wherein each of the convexes has a curved surface substantially flat in the first direction and having a curvature in the second direction.

8. The screen according to claim 1, wherein the convexes are arranged in both the first direction and the second direction orthogonal to the first direction.

9. The screen according to claim 8, wherein each of the convexes has a curved surface having curvatures in both the first direction and the second direction.

10. The screen according to claim 1, wherein the convexes are disposed substantially concentric with one another.

11. The screen according to claim 1, wherein the convexes are disposed along circular arcs each of which has a substantially equal radius.

12. The screen according to claim 1, wherein the convexes are formed by an ink jet method.

13. The screen according to claim 1, wherein the convexes are formed by embossing.

14. The screen according to claim 1, wherein the plurality of convexes are substantially concentric with each other.

15. The screen according to claim 1, wherein the plurality of convexes are disposed along a plurality of circular arcs, the plurality of circular arcs being concentric with each other.

16. A projection system, comprising:
a projection engine unit which projects light as an image in accordance with an image signal; and
a screen which receives light emitted from the projection engine unit,
wherein
the projected image includes a plurality of image pixels;
the screen has a plurality of convexes disposed on a flat surface with a clearance left between one another,
the screen has a pitch of the plurality convexes being equal to or less than one fifth of a pitch of the plurality of image pixels of the projected image.
the projection engine unit applies light to the screen in a predetermined direction other than the normal line direction of the flat surface, and
the convexes reflect light emitted from the projection engine unit and block the light from the projection engine unit by reflecting the light such that the light cannot reach each area between the adjoining convexes on the flat surface.

17. The projection system according to claim 16, wherein:
each of the convexes has a reflection portion which reflects the light emitted from the projection engine unit; and
reflectance of the reflection portion when reflecting the light emitted from the projection engine unit is higher than when reflecting light having a wavelength range other than the wavelength range of the light emitted from the projection engine unit.

18. The projection system according to claim 16, wherein:
the projection engine unit and the screen are disposed in such positions that the optical axes of the projection engine unit and the screen coincide with each other; and
each of the convexes is disposed substantially concentric with one another with the center of the concentric circle located at the cross point of an extension surface of the flat surface and the optical axis or in the vicinity of the cross point.

19. The projection system according to claim 16, wherein the plurality of convexes are substantially concentric with each other.

20. The projection system according to claim 16, wherein the plurality of convexes are disposed along a plurality of circular arcs, the plurality of circular arcs being concentric with each other.

* * * * *

UNITED STATES PATENT AND TRADEMARK OFFICE
CERTIFICATE OF CORRECTION

| | |
|---|---|
| PATENT NO. | : 7,532,396 B2 |
| APPLICATION NO. | : 11/869434 |
| DATED | : May 12, 2009 |
| INVENTOR(S) | : Masatoshi Yonekubo and Akira Shinbo |

It is certified that error appears in the above-identified patent and that said Letters Patent is hereby corrected as shown below:

Title page, item [30] insert the following:

--Foreign Application Priority Data

Oct. 13, 2006    (JP)     2006-279506
Aug. 6, 2007    (JP)     2007-203867--

Signed and Sealed this

Fourteenth Day of July, 2009

JOHN DOLL
*Acting Director of the United States Patent and Trademark Office*